UNITED STATES PATENT OFFICE.

GERHARD NICOLAAS VIS, OF PARIS, FRANCE.

PROCESS OF MAKING AMMONIUM SULFATE.

1,366,302.  Specification of Letters Patent.  Patented Jan. 18, 1921.

No Drawing. Original application filed October 25, 1918, Serial No. 259,681. Divided and this application filed December 3, 1919. Serial No. 342,246.

*To all whom it may concern:*

Be it known that I, GERHARD NICOLAAS VIS, a subject of the Queen of the Netherlands, and a resident of Paris, France, have invented new and useful Improvements in Processes of Making Ammonium Sulfate, which invention is fully set forth in the following specification.

It is known that the ammonia contained in gases from coke ovens or from gas works and other gases, is in a state of extreme dilution and that the fixing of the ammonia present whether in the form of free ammonia, of carbonate, or hydrosulfid or other form, takes place easily either by absorption in sulfuric acid which transforms practically all the ammonia into ammonium sulfate, or by absorption in water with the production of crude ammoniacal liquors which are subsequently transformed into ammonium sulfate by the aid of lime and sulfuric acid.

This invention has for its primary objects to replace the sulfuric acid with an agent of less commercial value and to resolve the resulting product into constituents of wider usefulness in the arts.

According to this invention sodium bisulfate is employed for this purpose.

The sodium bisulfate is employed either in the solid state in the presence of a quantity of water insufficient to dissolve it completely or in a more or less concentrated solution.

The absorption of the ammonia takes place as if sulfuric acid were employed, but the resulting product consists of ammonium sulfate and sodium sulfate in about equimolecular proportion according to the composition of the sodium bisulfate employed. These two products form a double salt:

which crystallizes very easily and which is of no commercial value.

According to this invention the salt is transformed into chemically or commercially pure ammonium sulfate and sodium sulfate.

In order to separate sodium sulfate and ammonium sulfate starting from their equimolecular or nearly equi-molecular mixture, I take advantage of the fact of the non-existence of the double salt at a high temperature in the presence of water.

By way of example illustrating one method of carrying out the process:

500 kgs. of coarsely crushed sodium bisulfate are placed in contact with about 280 kgs. of water. The gases to be treated are passed through the mixture which is heated to about 70° C. All the ammonia contained in the gases is absorbed by the sodium bisulfate which is transformed into the double salt

The sludge produced is heated with agitation to a temperature of 111° C., that is, the boiling point of the saturated solution of the sodium and ammonium sulfates; the double salt is decomposed and over half of the sodium sulfate formed is deposited in the form of anhydrous salt. The whole is then brought to a temperature of about 110° C., in a pressure filter and the anhydrous sodium sulfate is collected. By again crystallizing after dissolving in water the salt is obtained in a pure state in the form of crystals, easy to dehydrate in the air while the mother liquors are returned into the working cycle.

The filtrate resulting from the filtration at 110° C. of the anhydrous sodium sulfate is allowed to cool for example to 70° C. A quantity of about 55 kgs. ammonium sulfate crystallizes out and is separated by filtration. This ammonium sulfate contains due to the adhering mother liquors about 10% of sodium sulfate which can be easily removed by washing with water.

By altering the quantity of water originally added to the sodium bisulfate, the desired quantities of anhydrous sodium sulfate and crystallized ammonium sulfate may be separated; for example, the water necessary may be added so that the quantities of anhydrous sodium sulfate and ammonium sulfate separated by the two operations are nearly equi-molecular while the mother liquors are returned to the working cycle either after concentration or after replacing the water which is added to the crude bisulfate.

The subject matter herein claimed is disclosed in my earlier application Serial No. 259,681, filed October 25, 1918, of which the present application is a division.

What I claim is:

1. The process of transforming ammonia mixed with inert gases or steam into ammonium sulfate which consists in subjecting said gases to the action of solid sodium acid sulfate in presence of water at about 70° C. insufficient to dissolve said acid sulfate, heating the resulting mixed solid double sulfate and liquid to about 111° C. to decompose the double sulfate therein, separating the solid sodium sulfate from the liquid portion and recovering the ammonium sulfate from said liquid portion.

2. The process of transforming ammonia mixed with inert gases or steam into ammonium sulfate which consists in subjecting said gases to the action of solid sodium acid sulfate in presence of water at about 70° C. insufficient to dissolve said acid sulfate, heating the resulting mixed solid double sulfate and liquid to about 111° C. to decompose the double sulfate therein, filtering said mixture while heated to separate sodium sulfate and cooling the filtrate to separate ammonium sulfate and returning the mother liquid to the working cycle.

In testimony whereof I have signed this specification.

GERHARD NICOLAAS VIS.

Witnesses:
  HENRY T. WILCOX,
  ANDRÉ PLAN.